United States Patent [19]

Mankovitz

[11] Patent Number: 5,541,738
[45] Date of Patent: Jul. 30, 1996

[54] ELECTRONIC PROGRAM GUIDE

[75] Inventor: Roy J. Mankovitz, Encino, Calif.

[73] Assignee: E. Guide, Inc., Beverly Hills, Calif.

[21] Appl. No.: 226,656

[22] Filed: Apr. 12, 1994

[51] Int. Cl.$^6$ .......................... H04N 7/087; G11B 27/02
[52] U.S. Cl. ..................... 358/335; 348/460; 348/563; 348/734; 348/906
[58] Field of Search .................... 358/335; 348/735, 348/906, 460, 563; H04N 7/087

[56] References Cited

U.S. PATENT DOCUMENTS

| | | | |
|---|---|---|---|
| 4,025,851 | 5/1977 | Haselwood et al. | 455/2 |
| 4,908,707 | 3/1990 | Kinghorn | 348/906 |
| 4,977,455 | 12/1990 | Young | 348/460 |
| 5,210,611 | 5/1993 | Yee | 348/906 |
| 5,260,788 | 11/1993 | Takano et al. | 348/478 |
| 5,287,224 | 2/1994 | Tsuchiya et al. | 360/14.3 |
| 5,353,121 | 10/1994 | Young et al. | 348/563 |
| 5,382,983 | 1/1995 | Kwoh | 348/716 |

*Primary Examiner*—Howard W. Britton
*Attorney, Agent, or Firm*—Christie, Parker & Hale, LLP

[57] ABSTRACT

An indexing VCR system which responds to broadcast information to record a program guide which may subsequently be displayed to apprise the user of programs to be broadcast during the next day or week, etc. The program guide enables the user to condition the VCR to record selected programs when they are broadcast. The program guide may also include film clips of selected programs to assist the user in making a decision as to whether he/she desires to record any particular program. The program guide is preferably recorded on the video tape in the VCR in the form of a multi-cell grid and as full frame video so that information concerning each program may be displayed in respective cells in the grid. Other information, such as the PLUSCODE™, address of the corresponding clip, etc., may be transmitted to the user during the VBI intervals, or by other means.

27 Claims, 10 Drawing Sheets

ELECTRONIC PROGRAM GUIDE

BACKGROUND OF THE INVENTION

The programming of a VCR for unattended recording was greatly simplified by the introduction of compressed codes for the channel, date, time, and length (CDTL) data for a desired program. The compressed code of Gemstar Development Corporation is known as PLUSCODE™ compressed code.

The further aid in the programming for unattended recording, the program guide or schedule of programs to be broadcast over the air or by cable at a later date are available in the VBI, as full frame video, on tape, on floppy discs or in ROM. The program guide is displayed to provide the user with easy access to the guide and as an aid in programming the VCR for later recording.

SUMMARY OF THE INVENTION

The electronic program guide of the present invention provides a video magazine format with respect to video program listings, and it also provides video program clips, to enable a user to select a video program for future viewing or recording. Advantageously, the electronic program guide of the present invention is employed in conjunction with an indexing video cassette recorder/player. The indexing video cassette recorder/player may be of the same general type described in co-pending applications Ser. No. 08/066,666 filed May 27, 1993 and Ser. No. 08/176,852 filed Dec. 29, 1993, which are incorporated herein by this reference.

In the practice of the invention, during regular broadcast hours, a particular channel such as HBO, NBC, CBS, CNN, etc., broadcasts an electronic program guide listing future programs. The program guide is preferably in the format of a video magazine, in which the video portion is divided into video sections or chapters with each chapter representing the program listings for one of a plurality of categories of programs, such as movies, sports or comedy, for example. The program listings form a menu and are arranged in a grid made up of numbered cells. The video section includes a plurality of such menus separated by a video clip relating to one of the listed programs.

During the broadcast, program-related information (PRI) is transmitted, for example, in the vertical blanking interval (VBI), or by other means, relating to the positions of each numbered cell, the start and stop addresses of video clips and also the PLUSCODE™ number for the particular program.

The program guide may be recorded on tape or in RAM of the VCR. For unattended recording, the program guide may have a listed PLUSCODE™ for entry by a user and decoding by the VCR to record when the program guide is transmitted (either over the air or by cable). The electronic program guide, when broadcast, is recorded in the VCR at the time of the broadcast, to be selected at a subsequent time by the user and displayed. Alternatively, the program guide may be available to the user as a prerecorded guide on tape purchased on a subscription basis or from a retail outlet.

The program guide may include PLUSCODE™ numbers for ease of programming for future recording of desired programs or a cursor may be employed upon display of a selected program guide or a number may be entered that corresponds to the cell number of the desired program displayed in a numbered cell of the grid.

DETAILED DESCRIPTION OF THE ILLUSTRATED EMBODIMENT

Figure 1:
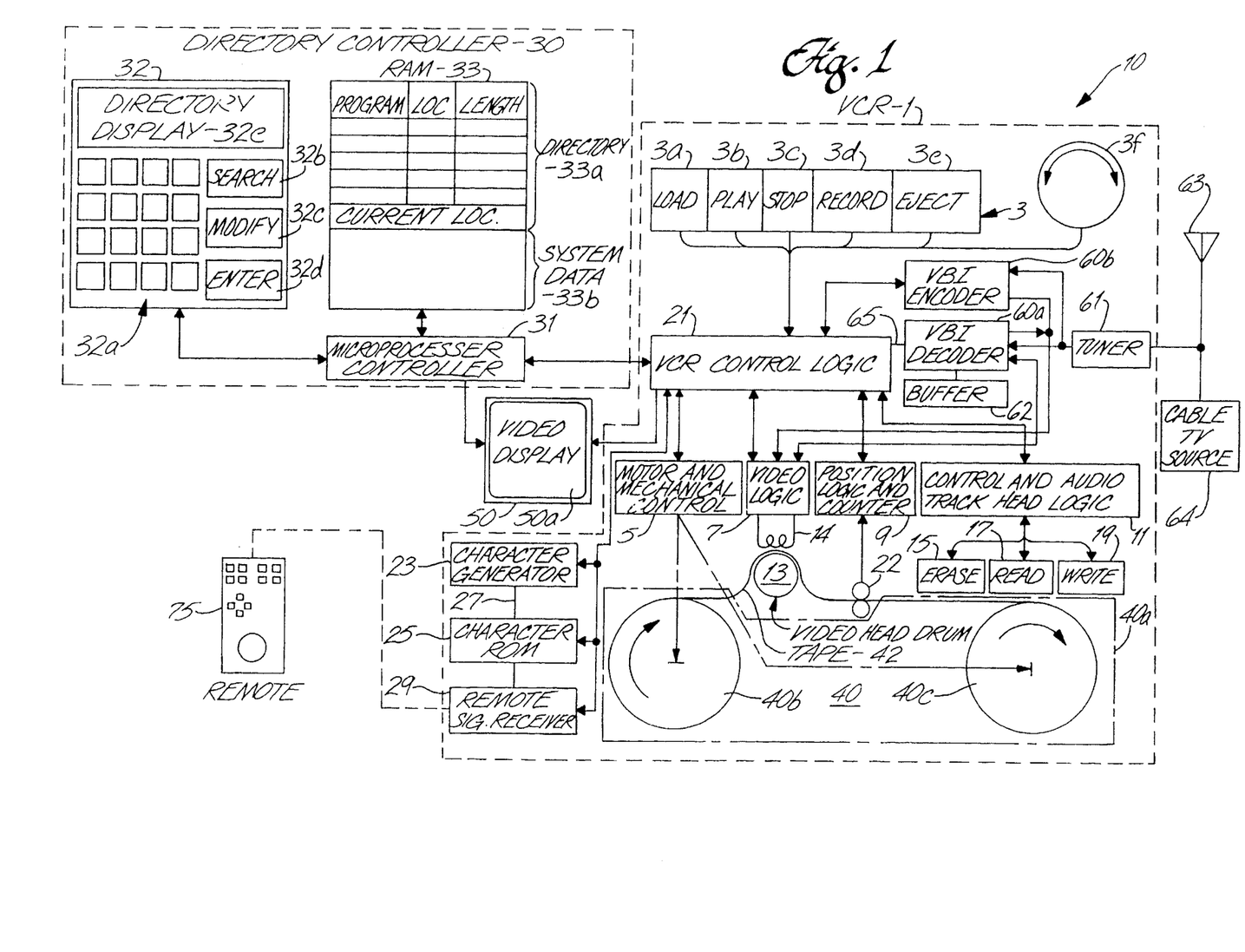
FIG. 1 is a block diagram illustrating an indexing video cassette recorder, using a hybrid indexing system that provides indexing of recorded programs for home recorded tapes, prerecorded tapes, and retroactively indexed tapes, of a standard video cassette format, and that has a directory controller, a bus interface and an output interface and embodies the invention.

FIG. 1 is a block diagram of an indexing VCR system 10 which may be used in conjunction with the concept of the invention, and is of the type disclosed in co-pending application Ser. No. 08/176,852 VCR system 10, as described in the co-pending application, includes a video cassette reader/recorder (VCR) 1 with a conventional video tape cassette 40, a video display 50, and a directory controller 30. The VCR 1 is a conventional indexing video reader/recorder device and uses any one of many different recording technologies. In particular, the VHS-C indexed tapes can be played directly on the indexing VCR 1 with full index functioning. The cassette 40 is a conventional video cassette having a magnetic tape 42 packaged in a cartridge or cassette housing (hereafter called cassette). Even though the size and design of the housing is different for different types of recording technology, the basic information that goes on the tape itself is similar. The technology and operation of a VCR are well understood in the art.

The VCR 1 has a button control panel 3 with control buttons, including LOAD 3a, PLAY 3b, STOP 3c, RECORD 3d, and EJECT 3e, for controlling the operation of the VCR 1. The LOAD button 3a is optional and is not used on machines which load automatically. The VCR control logic circuit 21 receives control signals from the button control panel 3 and controls the overall operation of the VCR 1 by sending control signals to a motor and mechanical control logic circuit 5, a video logic circuit 7, a position logic and counter circuit 9, and a control and audio track head logic circuit 11 of the VCR 1, as well as to the video display 50 and the microprocessor controller 31 of the directory controller 30.

The motor and mechanical control logic circuit 5 controls loading and ejecting of the cassette 40 and also controls movement of the video tape 42 within the video cassette 40 during recording, reading (playback), fast forward, and rewind. The video logic circuit 7 controls the operation of a video read/write head drum 13 in reading from or recording video signals to the tape 42. The electrical signals are magnetically coupled between the video logic circuit 7 and the video head drum 13 using a winding 14. The position logic and counter circuit 9 monitors tape movement through a cassette tape movement sensor 22 and generates signals that represent tape position. The control and audio track head logic circuit 11 controls writing, reading, and erasing of signals on the control or audio track of the tape 42 through the write head 19, the read head 17, and the erase head 15.

The directory controller 30 includes a microprocessor controller 31, a random access memory (RAM) 33 and a directory input/output display and control panel 32. Preferably the microprocessor controller 31 comprises an integrated circuit microprocessor, a program store, such as a read-only-memory (ROM), for storing a control program to implement methods of the invention, and a clock for generating a clock signal for timing functions and providing the time. The time may be set using the directory input/output display and control panel 32 in a manner known in the art. Alternatively, the VCR 1 may maintain the time. The RAM 33 is a conventional random access semiconductor memory which interfaces directly with the microprocessor controller 31. The RAM 33 is preferably non-volatile. Alternatively, the RAM 33 is battery backed up. A portion of the RAM 33 shown as system data 33b, is also used for storing the system software of the microprocessor controller 31. The RAM 33 is also used for storing the program directory 33a.

The directory input/output display and control panel 32 has an alphanumeric keyboard 32a and special function keys, such as a SEARCH key 32b for commanding searches for data in the directory 33a and on the tape 42, a MODIFY key 32c for modifying or deleting directory information in the RAM 33, and an ENTER key 32d for entering program directory information. Instead of providing special function keys, functions can also be initiated by entering predefined sequences of conventional keys on the alphanumeric keyboard 32a.

Display 32e of control panel 32 is a conventional liquid crystal, or other type of display, for displaying data being entered on the keyboard 32a, and to display the directory or other information stored in the RAM 33. Alternately, as discussed below, an on-screen display 50a can be used. The directory information stored in the RAM 33 is processed by the microprocessor controller 31.

The VCR 1 additionally comprises a character generator circuit 23 coupled to the VCR control logic circuit 21 and to a character generator read-only memory (ROM) 25. Character generators are well known in the art. Typically, the character generator ROM 25 stores a data table representing pixel or bit patterns of a plurality of alphanumeric characters, such as the Roman alphabet and the Arabic numerals. Upon command by the VCR control logic circuit 21 and the character generator circuit 23, the data in the character generator ROM 25 is read and placed in an output signal to the video display at a position on the display determined by coordinates generated by the microprocessor controller 31. The end result is visual display of an alphanumeric character on the display screen. Character generators are well known for channel display in television receivers, and for use in professional titling equipment.

As shown in FIG. 1, decoding can be implemented by coupling an input of a VBI signal decoder 60a to the output of a tuner 61 which is generally included in the majority of consumer VCR's for off-the-air recording. The tuner 61 receives a broadcast signal from an antenna 63 or a cable TV signal source 64. Both the decoder, the tuner, and the interaction of both, are conventional in the art. Examples of commercially available VBI decoders include the TeleCaption 4000 Adaptor, commercially available from National Caption Institute, Falls Church, Va., and Teletext Decoder, available from Norpak Corporation, Ottawa, Canada. A decoder signal line 65 is coupled from the decoder to the VCR control logic circuit 21 to carry decoded data to the control logic circuit. The VCR control logic circuit 21 is commanded by the microprocessor controller 31 to pass the decoded data to the directory 33a under control of a stored program in the RAM 33. The program then causes the information to be stored as a program title in the directory and displayed on the display 50.

VBI data is placed in a broadcast TV signal by a broadcast TV station in a continuous stream; a user of the VCR 1 cannot stop or slow down the stream without additional hardware. Thus, it is possible that the first data received by the antenna 63 is not the program title. This problem can be overcome by coupling a data buffer memory 62 to the decoder. Under control of the decoder, all VBI data received by the VBI decoder 60a is stored in the caption buffer and serially output to the VCR control logic circuit 21. Each data word is displayed in the directory, and the user presses the ENTER button to accept the word and store it as a program title.

Not only can the information (e.g., title, subtitle, program identification) transmitted during the VBI portion be displayed in real time or used to generate a program title for the directory, it can be utilized to further facilitate operation of the VCR. For example, by monitoring the transmitted title, the VCR can automatically detect the end of a program and stop recording thereto. Also by monitoring the VBI portion used for transmitting the title, the VCR can filter out (in recording a program) segments that are unrelated to the program (e.g., commercials), by temporarily stopping the VCR if changes in the title portion are detected.

It is disclosed in the preceding paragraphs that the VBI data may be broadcast at a relatively high repetition rate prior to broadcast, enabling a suitable decoder to detect the data. In the system of FIG. 1, the decoder 60a can be designed to receive and store in buffer 62 the program identification information from line 21 of field 2 of each frame. Using suitable logic, the program title and other information can be stored automatically in the directory 33a, without user intervention.

Figure 2:
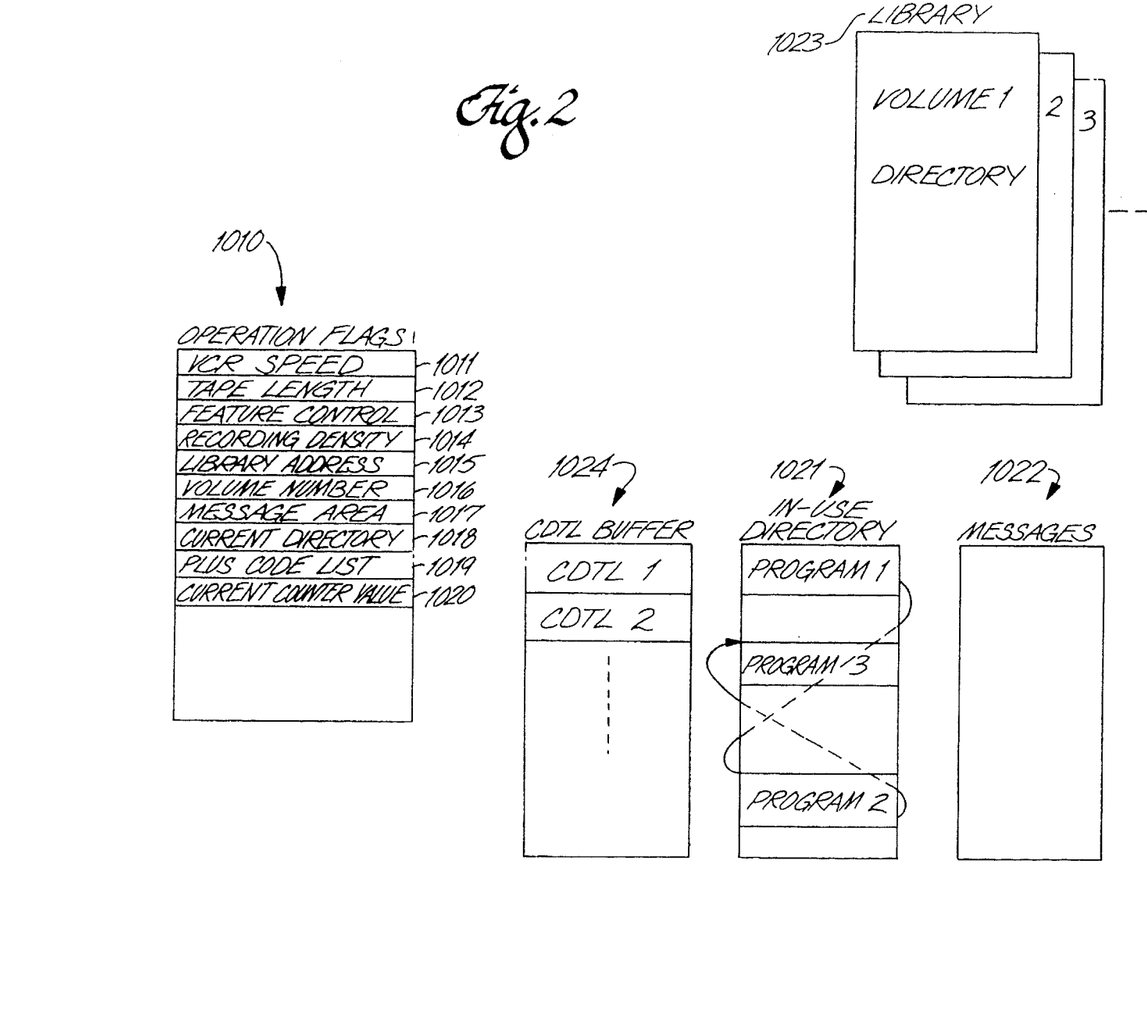
FIG. 2 is a schematic diagram conceptually illustrating the structure of data stored in the RAM of the directory controller of FIG. 1.

Now the memory structure of the RAM 33 is described by referring to FIG. 2 which is a schematic conceptually illustrating a typical structure of the data stored in the RAM 33. The RAM 33 can be viewed conceptually as having an area 1010 for storing operation flags. These flags include a mode flag (MODEFLAG) 1011 for indicating the operation speed (e.g., SP, LP, or SLP) of the VCR 1 and which will be changed whenever the operation speed of the VCR 1 is changed. A tape length flag (TAPELNG) 1012 indicates the length (e.g., E-60, E-90, E-120) of an inserted tape 42. A second memory flag 1014 (SECMEM) stores access information of a secondary memory which may be provided on the cassette 40 for storing directory information, as described in the co-pending application.

The flags also include a feature control field (FTCNTL) 1013 for specifying the VCR functions that are available to a user. In the simplest case, if a secondary memory is needed on the cassette for storing directory information, FTCNTL 1013 will be set in one way if an inserted cassette has the secondary memory and in another way if the inserted cassette has no secondary memory. FTCNTL 1013 may also specify other functions, and can be set by reading a code carried at a predetermined area of the cassette (e.g., on a magnetic strip on the cassette housing).

Area 1010 also stores a message pointer 1017 pointing to a message area 1022 which stores input and output messages; and a CDTL pointer 1019 pointing to a CDTL buffer 1024 which stores channel-date-time-length (CDTL) data of future recordings. A library 1023 is also provided in the RAM 33. The library 1023 stores directories of tapes which users of the VCR 1 have archived. Each directory stored in the library contains substantially the same information as the in-use directory. If a library is present, a library pointer 1015 is provided for pointing to the library 1023.

A directory pointer 1018 is also provided for pointing to an in-use directory 1021 which stores the directory of the currently inserted tape. This directory pointer 1018 may actually point to a location in the library wherein the directory of the tape is located.

In addition, the area 1010 also stores a volume number field (VOLNO) 1016 which stores a counter value representing the number of tape directories already stored in the library 1023. Other flags may be added as needed.

Figure 3:
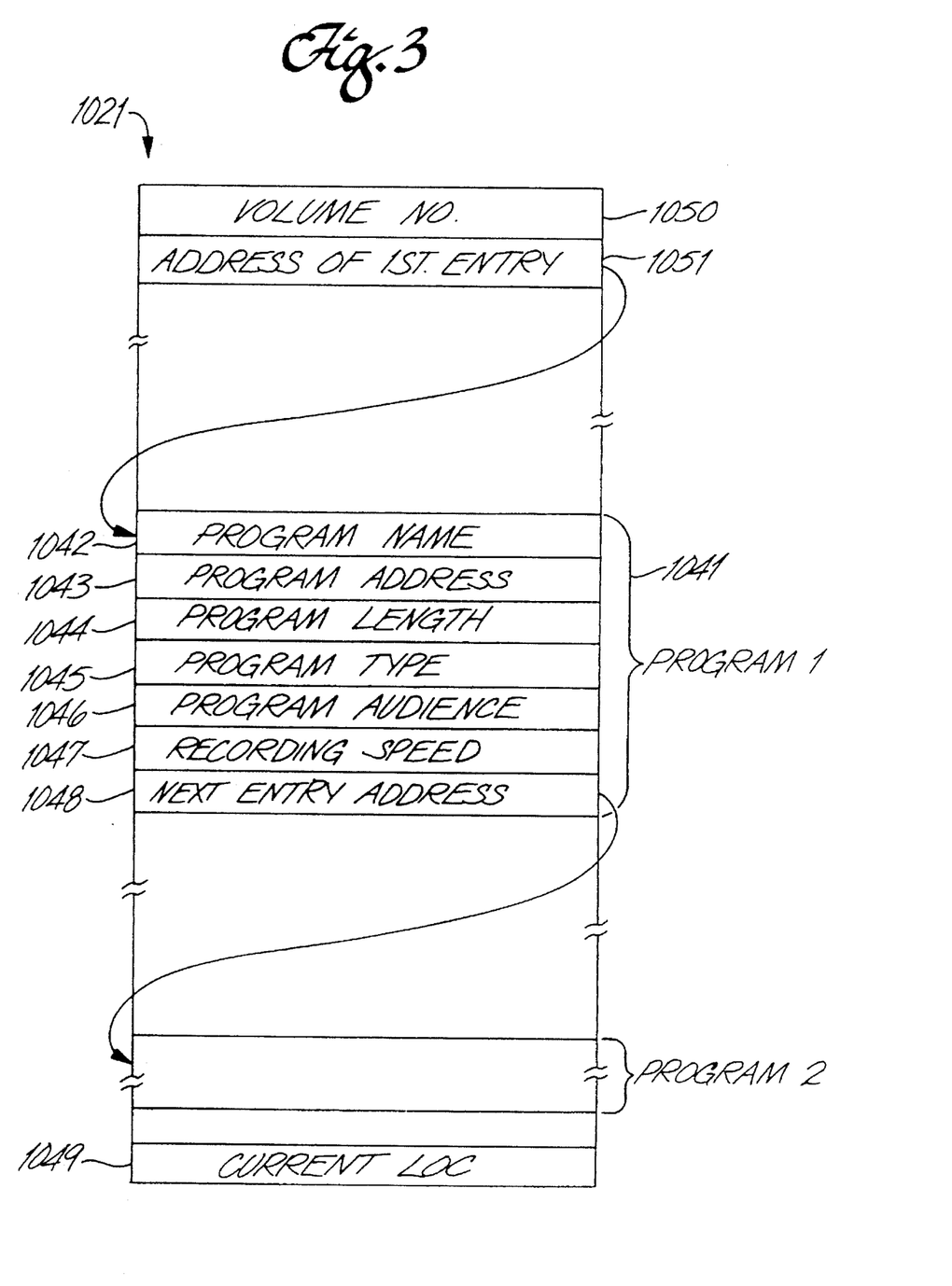
FIG. 3 is a schematic illustrating a conceptual structure of an in-use directory in the data structure of FIG. 2.

Referring to FIG. 3, which is a schematic illustrating a conceptual structure of the in-use directory 1021 in the data structure of FIG. 2, the in-use directory 1021 stores the directory of the cassette tape currently inserted into the VCR 1. For each program recorded on the cassette tape, a corresponding entry 1041 is set up in the in-use directory 1021. For purposes of illustration, FIG. 3 shows the entry 1041 only for program 1. However, each program similarly has an entry 1041. Each entry 1041 stores a title or program name (PROGRAM) 1042; a program address (LOC) 1043 which stores the absolute tape counter value of the beginning of the program; a program length value (LENGTH) 1044 which stores the length of the recorded program, represented as a function of the difference between its address from the address of the next program or record or a measure of time from a fixed reference point, such as the beginning of the tape; an optional program type field (TYPE) 1045 which stores the category of the recorded program; an optional program audience field (AUDIENCE) 1046 which stores the recommended audience of the program; and an optional recording speed (SPEED) 1047 which stores the speed at which the program is recorded.

A current tape location (CURRENT LOC) 1049 is also stored in the directory for indicating the absolute position from the beginning of the tape 42 in the cassette 40 where the valid directory is located, or the value of the tape counter when the tape is ejected. This field is used for setting the tape counter when the tape is reloaded into the VCR 1. The recording on the tape of the absolute tape position is described below.

A field 1051 is a pointer pointing to the address of the first entry of the directory 1021 represented in FIG. 3 by an arrow pointing to the program name (PROGRAM) 1042. Each entry also has a field 1048 storing the address of the next entry in the directory also represented in FIG. 3 by an arrow pointing to program 12. These fields provide a link from one entry to the next entry and are used for facilitating search, deletion, and addition of entries. In the preferred embodiment, the directory information is not stored on the tape 42, but is retrieved from the library 1023. In this embodiment, a volume label (VOLNO) 1050 is provided in the in-use directory 1021. This field is used for retrieving the directory information of the tape from a library 1023 stored in the RAM 33.

Each item in the directory can be modified through the use of the buttons on the keyboard 32a and the special function keys 32b, 32c, 32d of the directory controller 32, as will be described below.

Figure 4:
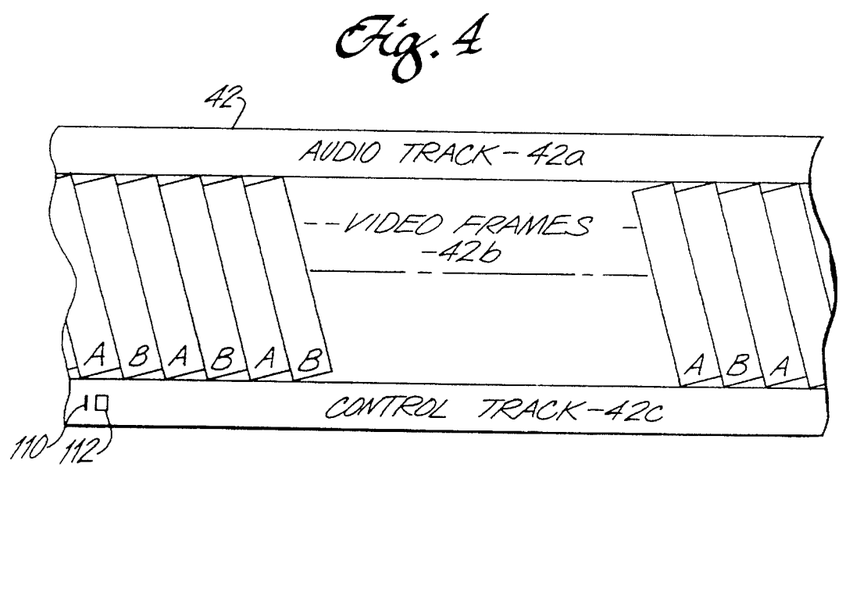
FIG. 4 is a graphical representation of the format of the information recorded on the magnetic tape in the cassette of FIG. 1 with markers and directories in the control track.
Figure 5:
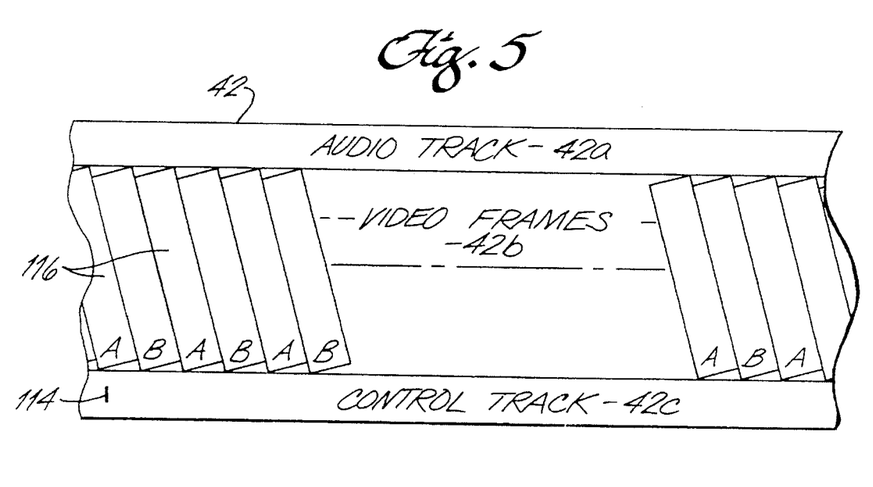
FIG. 5 is a graphical representation of the format of the information recorded on the magnetic tape in the cassette of FIG. 1 with markers in the control track and the directories in the fields of the video frames.

By way of background, the format of the tape 42 is now described. FIGS. 4 and 5 illustrate the information content of one example of video tape for both BETA and VHS format which both use the same general tape layout. The tape 42 is divided into three areas. A narrow strip running along the upper edge of the tape 42 is an audio track 42a which contains audio signals. A second narrow strip running along the bottom edge of the tape is a control track 42c which contains synchronization ("sync") control signals. The middle area 42b is for video signals which are recorded in pairs of parallel fields going up and down the width of the tape at a slight angle. The markers 110, 112, and 114 may be used to mark sections of the tape.

The video head drum 13 is fitted with two read/record heads 180 degrees apart, so that even numbered lines make up one field and odd numbered lines make up the other field. To reduce flicker on the video screen, these fields are projected onto the face of the cathode ray tube (CRT) screen 50a of the video display 50 at alternating intervals.

Video images in cathode ray tube (CRT) type video devices (e.g., television) are generated by scanning a beam along a predefined pattern of lines across a screen. Each time all the lines are scanned, a frame is said to have been produced. Each video frame is divided into two fields, referred to as field 1 and field 2.

The VCR control logic circuit 21 or the TV control circuitry scans the beam typically from the top, left-hand corner across the screen. After it finishes scanning one line, the beam returns to the left-hand side and scans along another line which is parallel to but lower than the previous line. The scanning continues until the beam reaches the center of the bottom part of the screen, thus completing the lines that form field 1.

From the bottom center of the screen, the beam returns to the top, where it starts scanning from substantially the center of the screen along lines which interlace the lines of field 1. These lines form field 2. When the beam reaches the bottom, right-hand corner of the screen, a picture frame is formed. In the NTSC protocol widely used in North America, each field contains 262.5 horizontal lines and a pair of fields constitute a single 525-line video frame and creates one video picture at one instant in time on the video display 50.

During the time in which the beam returns from the bottom to the top of the screen, it carries no video or picture signals and thus does not produce any picture element on the screen. This time interval is generally known as the vertical blanking interval (VBI). Its duration is generally several times and typically 21 times the time duration that it takes the beam to scan across the screen. In other words, the length of the VBI is equal to the time for the beam to scan several lines. Thus, the VBI typically contains a plurality of lines and is identified by the field with which it is associated. Apparatus and methods using these techniques are well known in the art and therefore are not discussed in detail herein.

Since no image element is produced on a television screen during a vertical blanking interval, proposals have been made to use the VBI for conveying auxiliary information from a television network or station to the audience. For example, Closed-Caption data associated with a television program are transmitted as encoded composite data signals during VBI line 21, field 1 of the standard NTSC video signal, at a rate of 480 bits per second.

By way of background, the data in the vertical blanking interval can be described in terms of the waveform, its coding and the data packet. The closed caption data waveform has a running clock followed by a frame code, followed by the data. The coding of the data is non-return-to-zero (NRZ) 7 bit odd parity.

Under mandatory FCC requirements effective July 1993, televisions having a size 13" and greater must provide closed captioning in two closed captioning fields which are used for two languages in real time and two text mode fields. The text mode fields fill the entire screen with texts. The default mode is an open ended mode in which the page is first filled up and then scrolled up. The individual recipient of such data has no control over the data.

Caption data decoding is further described in the following specifications, which are hereby incorporated by reference herein: Title 47, Code of Federal Regulations, Part 15 as amended by GEN. Docket No. 91-1; FCC 91-119; "CLOSED CAPTION DECODER REQUIREMENTS FOR THE TELEVISION RECEIVERS"; Title 47, C.F.R., Part 73,682(a) (22), Caption Transmission format; Title 47, C.F.R. Part 73,699, FIG. 6; "TELEVISION SYNCHRONIZING WAVEFORM"; Title 47, C.F.R., Part 73,699, FIG. 17A; "LINE 21, FIELD 1 DATA SIGNAL FORMAT"; and PBS Engineering Report No. E-7709-C, "TELEVISION CAPTIONING FOR THE DEAF: SIGNAL AND DISPLAY SPECIFICATIONS".

Under the extended data services (EDS) proposed in the *Recommended Practice for Line 21 Data Service*, Electronics Industries Association, EIA-608 (drafts Oct. 12, 1992 and Jun. 17, 1993) (hereinafter referred to as "EIA-608 standard", the subject matter of which is incorporated by reference, additional data is provided in line 21, field 2 of the vertical blanking interval. This requirement includes two closed captioning fields, two text mode fields and the extended data services. Table I shows the classification of data, the class control code, and the type code. The extended data includes, among other information, program name, program length, length into show, channel number, network affiliation, station call letters, UCT (universal coordinate time) time, time zone, and daylight savings time. In a typical distribution system upstream at the network, the network inserts the program name, the length of the show, the length into the show, the network affiliation, and the UCT time. Downstream at the affiliate, the affiliate inserts the channel number, the time zone, the daylight standard time and program names. The network inserts the data that does not differ for different affiliates.

The data is transmitted in packets. Six classes of packets are proposed in the EIA-608 standard, including: (1) a "Current" class for describing a program currently being transmitted; (2) a "Future" class for describing a program to be transmitted later; (3) a "Channel Information" class for describing non-program specific information about the transmitting channel; (4) a "Miscellaneous" class for describing other information; (5) a "Public Service" class for transmitting data or messages of a public service nature such as National Weather Service Warnings and messages; and (6) a "Reserved" class reserved for future definition.

According to the proposed EIA-608 standard, a packet is preceded by a Start/Type character pair, followed by information/informational characters pairs until all the informational characters in the packet have been sent.

Table I lists a subset of the control and type codes of various kinds of information to be broadcasted in the VBI according to the EIA-608 standard. For example, to transmit the program identification number (scheduled start time) of a program, a control code of 01 hex, a type code of 01 hex and a packet of four characters (one character specifying the minute, one character specifying the hour, one character specifying the date and one character specifying the month) are sent. Similarly, to transmit the program name, a control code of 01 hex, a type code of 03 hex, and a packet of between 2 to 32 characters are sent. As another example, the VBI may also be used to transmit a time-of-day value, by sending a control code of 07 hex, a type code of 01 hex, and a packet of two characters. The data format is also encrypted as described in other patent applications. The inserter 10007 stores data from the video stream and handles the insertion of such data into the video stream.

TABLE I

| Class | Class Control Code | Type |
|---|---|---|
| Current Class | | |
| Program Identification (scheduled start time) | 01 hex, 02 hex | 01 hex |
| Length/Time-in-show | 01 hex, 02 hex | 02 hex |
| Program Name | 01 hex, 02 hex | 03 hex |
| Program Type | 01 hex, 02 hex | 04 hex |
| Program Rating | 01 hex, 02 hex | 05 hex |
| Audio Services | 01 hex, 02 hex | 06 hex |
| Caption Services | 01 hex, 02 hex | 07 hex |
| Aspect Ratio Information | 01 hex, 02 hex | 09 hex |
| Composite Packet - 1 | 01 hex, 02 hex | 0C hex |
| Composite Packet - 2 | 01 hex, 02 hex | 0D hex |
| Program Description row 1 to 8 | 01 hex, 02 hex | 10 hex– 17 hex |
| Channel Information Class | | |
| Network Name (affiliation) | 05 hex, 06 hex | 01 hex |
| Call Letters (Station ID) and Native Channel | 05 hex, 06 hex | 02 hex |
| Tape Delay | 05 hex, 06 hex | 03 hex |
| Miscellaneous | | |
| Time of Day | 07 hex, 08 hex | 01 hex |
| Impulse Capture ID | 07 hex, 08 hex | 02 hex |
| Supplemental Data Location | 07 hex, 08 hex | 03 hex |
| Local Time Zone & DST Use | 07 hex, 08 hex | 04 hex |
| Public Service Class | | |
| National Weather Service Code | 09 hex, 0A hex | 01 hex |
| National Weather Service Message | 09 hex, 0A hex | 02 hex |

Referring back to FIG. 1, the microprocessor controller 31 controls the sequence and operation of the directory controller 30 and interfaces with the VCR control logic circuit 21 to implement the necessary functional capabilities for reading, updating and recording the directory. The microprocessor controller 31, according to a specific embodiment, is a microcomputer chip with part number of UPD 78234 from NEC Corporation.

The indexing VCR system described in the co-pending application provides a hybrid method for indexing recorded programs, which are recorded on a particular type of tape, such as home recorded tapes and prerecorded tapes. A home recorded tape (HR tape) is a tape on which the user has made recordings from broadcast or cable by either real time recording, timer programming his VCR, or using a VCR PLUS+™ programming system. As will be described below, the directory is created at the time of recording by the VCR. The second type of tape is a prerecorded tape (PR tape) that is a commercially purchased tape, such as a Raquel Welch work-out tape, a karaoke tape, songs, lectures or speeches, that contains many titles on it or may contain only one program. These tapes are not expected to be overwritten. The directory is stored on the tape by the video publisher at the time of the recording.

Each tape has a tape identification number (TID) written at some repetition rate along the whole tape on a VBI line for both home recorded and prerecorded tapes. The TID's reference the tape to a corresponding directory stored in the RAM 33. After the tape is inserted into the VCR, the VCR identifies the type of tape and locates and retrieves the corresponding directory from the RAM 33 or from the tape itself.

The VCR 1 shown in FIG. 1 also comprises a remote controller unit 75 which communicates through wireless means with a remote signal receiver 29 in the VCR. As is known in the art, the remote controller comprises a plurality of push buttons, switches, and a jog shuttle knob which create output signals. The signals are transmitted by wireless means known in the art, such as infrared transmission or radio-frequency signals, to the remote signal receiver 29. The receiver 29 decodes the received signal and passes the decoded data to the VCR control logic circuit 21.

Figure 6:
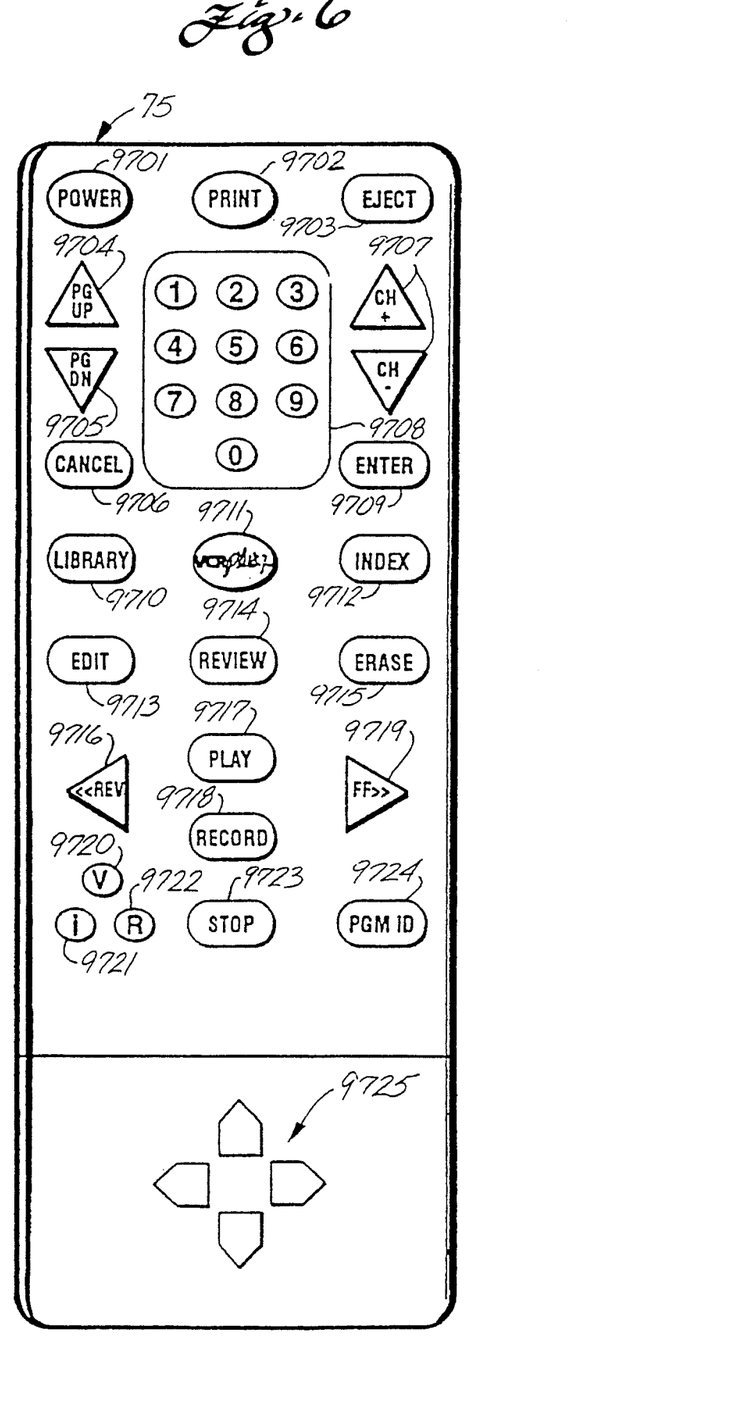
FIG. 6 illustrates an embodiment of a remote control unit for operating the indexing VCR of FIG. 1.

FIG. 6 is a schematic diagram of the remote controller 75 for the VCR of FIG. 1. The remote controller 75 has a plurality of push buttons or keys 9701–9725. A power switch 9701 enables turning power to the VCR 1 on and off. An eject button 9703 is used to eject the cassette 40 from the VCR. A page up button 9704 and a page down button 9705 are used to move up or down pages on the screen. A cancel button 9706 is used to cancel selections made. Channel change buttons 9707 enable toggling the channel selection up and down. A number keypad 9708 is used to enter numbers for commands and selections. An ENTER button 9709 is used to enter channel numbers and menu options in the methods discussed below. A library button 9710 is used to retrieve directories. A VCRPlus+™ button 9711 is used to enter "PLUSCODE™" numbers. An index button 9712 is used to enter an index mode.

An edit button 9713 is used to edit selections on the screen. A review button 9714 is used to review stored selections. An erase button 9715 is used to erase selections. A rewind button 9716, a play button 9717, and a fast forward button 9719 are used to control tape movement and are well known in the art. A record mode button 9718 enables selection of recording tape speed and to record programs. A stop button 9723 is used to stop movement of the tape. A program identification (PGM ID) button 9724 is used to display the program title and other information of the program being viewed either direct from cable or airwaves or from tape. A plurality of cursor movement or directional arrow buttons 9725, each shaped like an arrow, are used to move an on-screen cursor in various menu operations.

Referring back to FIG. 1, by using the VBI decoder 60a and the RAM 33, the indexing VCR 10 can capture data broadcast on the VBI and display it either concurrently with or at a later time to the data transmission. The broadcast data may be transmitted on a plurality of lines of the VBI including line 21. Per the E.I.A. specifications, Extended Data Services provide for pointers on line 21 (supplemental data location) to point to lines other than line 21. By using data on these other lines in the same format as data on line 21, the VBI decoder 60a can decode the other line data. In one instance this data may be a program guide. The program guide is the combination of the program Id's for a plurality of programs that will be broadcast in an upcoming predetermined time. In addition to the information included in the program Id, the program guide also includes the start times, the titles, and the "PLUSCODE™" numbers.

When a program is recorded on tape, for example, the program title is stored in the directory and also inserted in the VBI portion of the recorded program. A viewer can access the title of the program being shown by pressing the "Program ID" key. When the key is pressed, the microprocessor controller 31 sets the VBI decoder to decode selected field and lines of the VBI either from the broadcast signals or from the reproduced signals depending upon its mode of operation.

The program ID information for a plurality of viewed channels is stored in the RAM 33. Although some of the program ID information changes with the program (e.g., program title, start time, length, program category), this information is quickly retrievable from the memory when the user switches channels and requests the program ID to be displayed. Using the start time and length of the program, the indexing VCR 10 checks, periodically or in response to a Program ID command, whether the information is still within the valid time before displaying it on screen.

Information, such as a program guide, may be transmitted in the VBI and stored in RAM33 or recorded on tape. In either case, it may be retrieved when desired for selection of programs for viewing or recording.

When the stored program guide is used to implement timer programming of the VCR, the user programs the indexing VCR 10 to record the desired program by entering on the remote controller the "PLUSCODE™" number for the program he would like to record. In response thereto, the indexing VCR 10 stores the "PLUSCODE™" number into its programming stack for execution as described above.

In yet another embodiment of the video magazine, the broadcaster broadcasts an electronic program guide wherein the electronic guide includes the program title, channel, date, and time of upcoming programs as well as an associated video clip that further describes a particular program in the program guide. Thus, the electronic program guide includes both the menus which may be grouped by category or theme, such as movies, sports, etc. and the video clips as full frame video. Accordingly, all the information displayed on the screen is transmitted as video. The display is not limited by the character generator in the VCR.

To produce an electronic guide, the broadcaster or guide producer creates graphics by computer or other electronic devices or by hand. The broadcaster then generates video images of the graphics by filming or recording. The video images are then broadcast as a video magazine. Along with the video images, the broadcaster transmits, in the VBI, addressing information for correlating the images on the screen with other video images, such as the video clips, "PLUSCODE™" number or channel-date-length-time corresponding to a program depicted in the guide with a future broadcast, and position information for correlating positions on the screen of the guide menu with the video clips.

Figure 7:
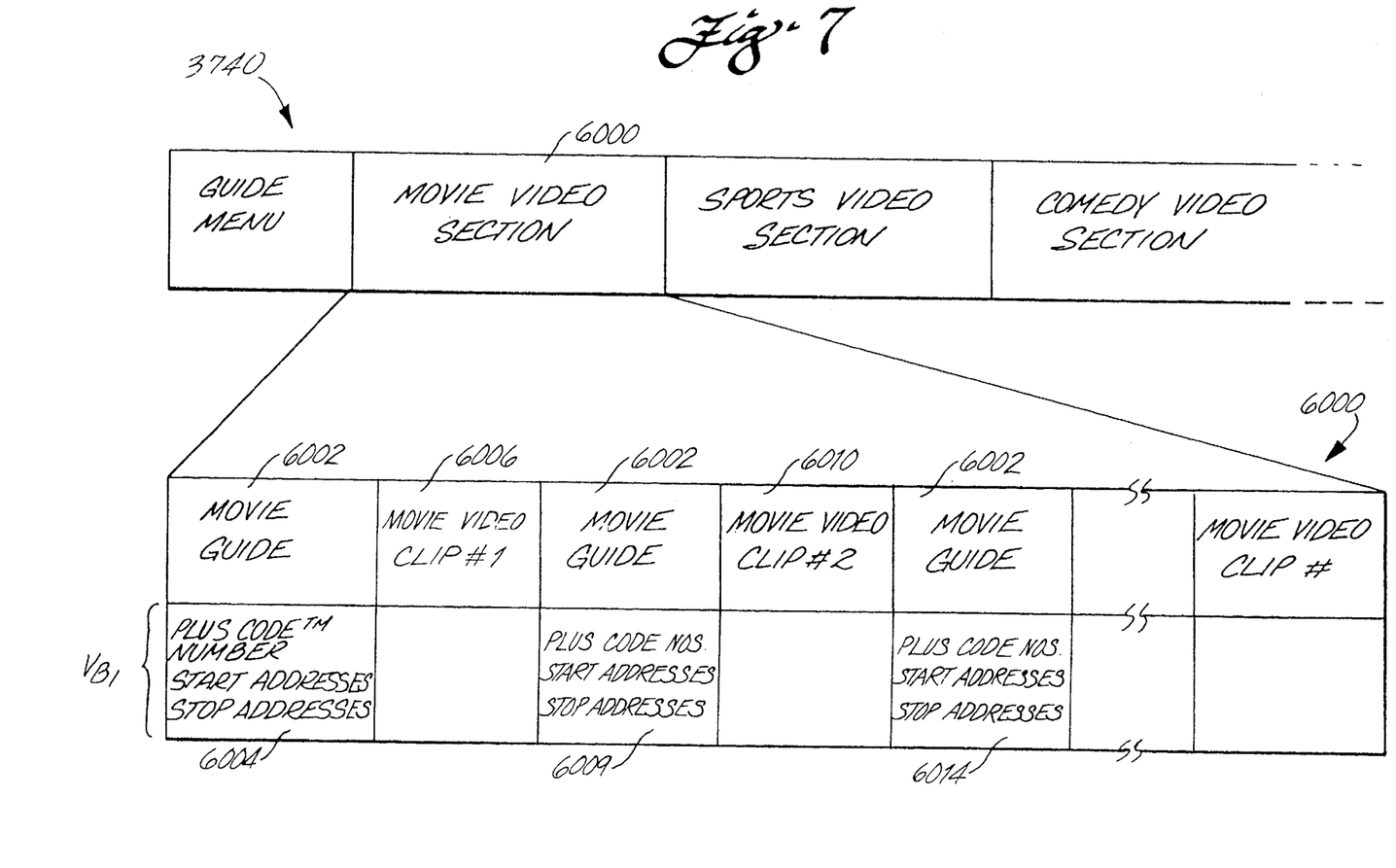
FIG. 7 is a schematic diagram illustrating the electronic program guide with a video grid and video clips with an exploded view of a movie guide portion of the guide.
Figure 9:
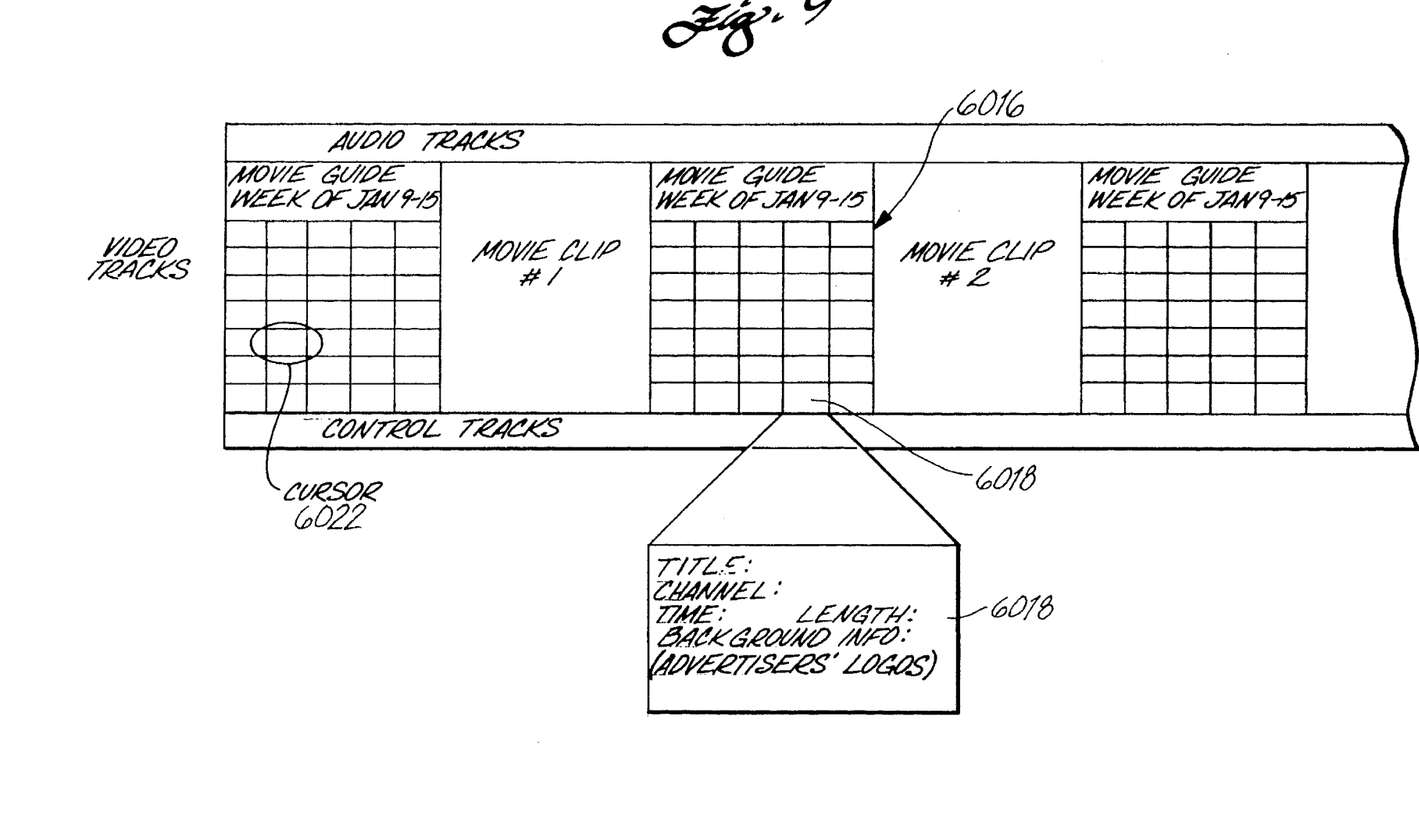
FIG. 9 is a schematic diagram of a movie guide portion of an electronic program guide received and recorded on the VCR in accordance with the invention where selection is by a cursor.

FIG. 7 is a schematic diagram illustrating the electronic program guide with a video grid and video clips with an exploded view of a movie guide portion of the guide. An electronic program guide 3740 has a guide menu and a plurality of video sections (also called video chapters). The guide menu contains information for the title and descriptions of the video sections (video clips) displayed in locations (or cells) arranged in a grid pattern on the screen. Along with the guide menu, the broadcaster transmits in the VBI the location of each cell of the grid and the start address and the stop address for the corresponding video section. Each video section represents the program listings for one of a plurality of categories of programs, such as movies, sports or comedy. Furthermore, each video section has a plurality of chapter menus 6002 spaced apart in time in the broadcast guide or along the tape after recording and a plurality of movie video clip sections (6006, 6010) between the video menus 6002. As part of the video menu, part of the information related to the upcoming programs for the associated broadcaster is transmitted or recorded as a video image. This information is arranged so that when the associated video is displayed, the information for each program of the menu is displayed in cells 6018 arranged in a grid 6016 on the screen (FIG. 9). This information may be in different fonts and colors. It may also include pictures of actors or scenes of the show or advertiser or show logos. Information 6004 relating to the position of each cell 6018 and the start and stop addresses for the corresponding video clip (6006, 6010) is transmitted in the VBI of the first video menu of the video section. The addresses may be timed at a particular tape speed or length. Also transmitted in the VBI is the "PLUSCODE™" numbers for the corresponding program.

Within each grid 6016, a plurality of programs and associated information are displayed in respective cells 6018 of the grid. The character generator in the VCR provides a cursor which may be superimposed over the video grid displayed on the screen. The portion 6016 of the representative recording on tape illustrated on FIG. 9 appears on the screen of the display, such as the TV. The program guide may have been recorded by the user's VCR or the tape with guide may have been purchased. In either event, the user controls the position of the cursor on the screen by using the remote controller. The microprocessor controller 31 tracks the cursor position and correlates it to the associated program and video clip for that position stored in the VBI.

Although shown pictorially in FIG. 7 as being along side the movie guide 6002, the information (6004, 6009, 6014) associated with each cell in the grid is transmitted in the VBI and stored in RAM 33 or recorded on tape in the VBI or on the control track. Preferably, after reading the VBI data, the microprocessor controller 31 stores this information in the RAM 33. Alternatively, the information in the VBI may be broadcasted with each subsequent video guide and read from the VBI as each subsequent guide is displayed.

Figure 8:
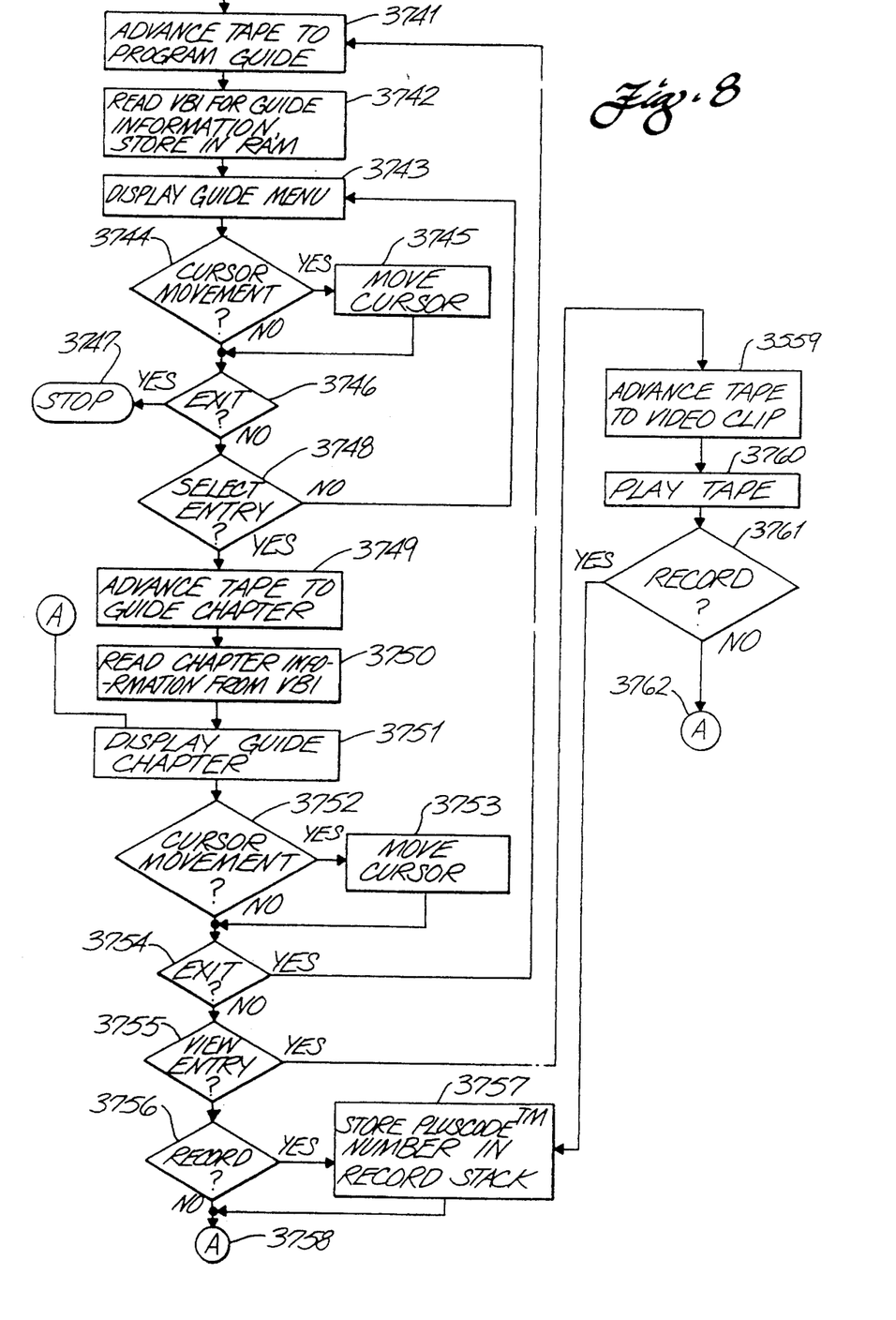
FIG. 8 is a flow chart showing the steps employed in the operation of the indexing VCR for an electronic program guide using a video grid and video clips where selection is by a cursor.

FIG. 8 is a flow chart showing the steps employed in the operation of the indexing VCR for an electronic program guide using a video grid and video clips with selection by use of a cursor. As a precursor to beginning the operation in FIG. 8, the user has selected the indexing function of the VCR and from the displayed directory selected the entry on the directory corresponding to the electronic program guide with video grids and video clips. In response to the user having selected the electronic program guide, the indexing VCR advances the tape to the beginning of the program guide, using the tape directory (step 3741). The VCR reads the vertical blanking interval for the guide information and stores it in the RAM 33 (Step 3742). The guide information includes the start and stop addresses and the cursor location for each of the video sections. The guide information functions as the directory information. The indexing VCR reads the category guide menu from the video tape and displays it on the screen (Step 3743). The length of the guide menu on the tape may be a single frame or frames covering several minutes. For guide menus having a few frames, the VCR is in the play and still frame mode allowing the user to browse the guide menu. Alternatively, the images of the still frame may be stored digitally and then displayed. If the guide menu contains multiple pages, the user advances pages by commanding the VCR to advance by using the frame advance button, or alternatively, a page button. In this mode, the VCR responds to a page command as it would a frame advance command. By using the cursor buttons on the remote controller 75 (FIG. 7) (Step 3744), the user can move the cursor on the screen (Step 3745). By pressing the exit button (Step 3746), the user may return to the directory of the entire video tape (Step 3747). Otherwise, the user selects from the category guide menu using the enter button to select the highlighted menu entry (Step 3748). As an illustrative example, the selected entry will be described in view of the movie guide shown in FIG. 9. While discussed as a movie guide, this description also pertains to other guides. After the user selects the movie guide, using the addressing information, the VCR fast-forwards the tape to the position for the movie guide grid which it knows from the information read from the VBI. After the tape advances to the program guide (Step 3749), the VCR reads the chapter information from the VBI where the chapter corresponds to the information for the movie video section (Step 3750).

This information relates the position of each cell, the start and stop addresses, and the "PLUSCODE™" numbers for the corresponding video clip to the title of the program. The VCR stores this information in the RAM 33. The VCR displays the chapter guide for the movie video section (Step 3751). By using the cursor keys (Step 3752), the user moves the cursor through the chapter guide (Steps 3753).

Alternatively, the user may exit the chapter guide and return to the guide menu (Step 3754). If the user elects to view an entry from the movie guide (Step 3755), the VCR reads from the RAM 33 the start address for the selected program and advances the tape to the video clip (Step 3759). The VCR then enters the play mode and plays the video clip (Step 3760). If the viewer wishes to record the program associated with the clip that he is viewing, the user presses the record button (Step 3761).

In response thereto, the VCR reads from the RAM 33 the "PLUSCODE™" number associated with the video clip and stores the number in the record stack for later recording (Step 3757). The VCR then advances to the guide chapter. If the viewer does not record a selection after the video clip, the video clip ends and by detecting the stop address of the video clip (step 3762), the VCR knows the detected video from the video tape is a movie guide and displays the guide chapter at step 3751.

From the guide chapter menu, the viewer may record the program without viewing the video tape (step 3756). In response to a record command, the VCR reads from the RAM 33 the corresponding "PLUSCODE™" number, stores it in the record stack (step 3757), and continues to display the guide chapter at step 3751.

The format of the broadcast information recorded on the video channel of the video tape in the VCR is shown in FIG. 9 as it relates, for example, to movies. The PRI, such as cursor position, PLUSCODE™, address of the movie clip, start/stop of the movie clip, is still transmitted, for example, in the VBI, as described above. This information may be recorded on the control track on the video tape. As an alternative, the PRI may be transmitted in the audio portion of the television signal and recorded on the audio channel of the tape. However, other information concerning the movie, such as the video clips, is transmitted as full frame video, as shown in FIG. 9.

Referring to FIG. 9, there is shown schematically how a movie guide portion of an electronic guide might be recorded on the video tape in the VCR. As shown, in the video portion of the tape, the recorded movie guide will be displayed in the form of a grid 6016 on the screen. The grid is arranged into a predetermined number of cells, for example 30, where such information as the channel, time, title, advertiser logo, and background information are displayed. Superimposed over the video grid is a cursor 6022 generated, for example, by a GS 102 chip, and controlled by the user using the remote control of FIGS. 1 and 6. The GS 102 keeps track of the cursor position so that it can correlate it to the movie data for that position as stored in the VBI.

Figure 10:
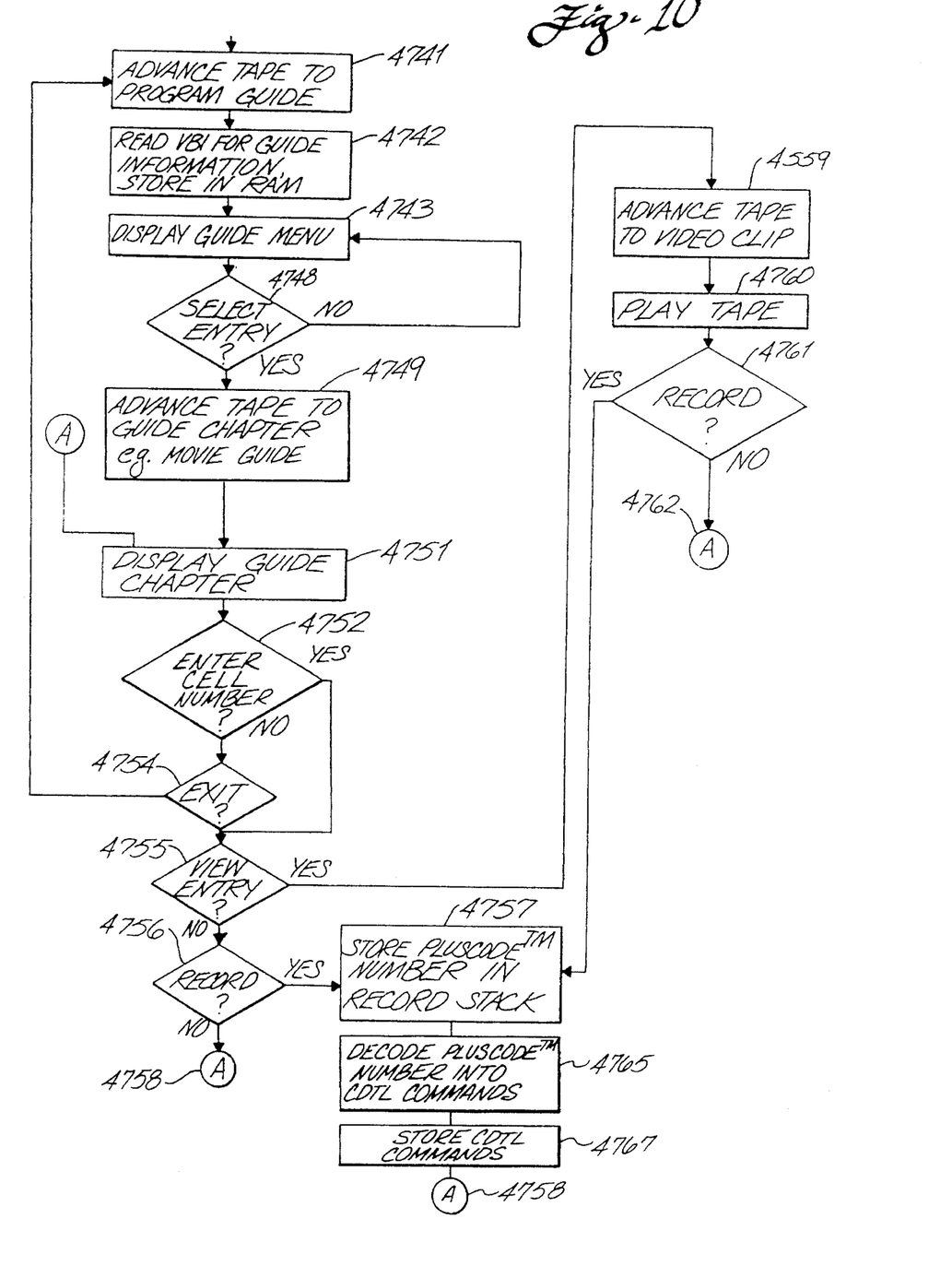
FIG. 10 is a flow chart showing the steps employed in the operation of the indexing VCR for an electronic program guide using a video grid and video clips where selection is by number of the numbered cells.
Figure 11:
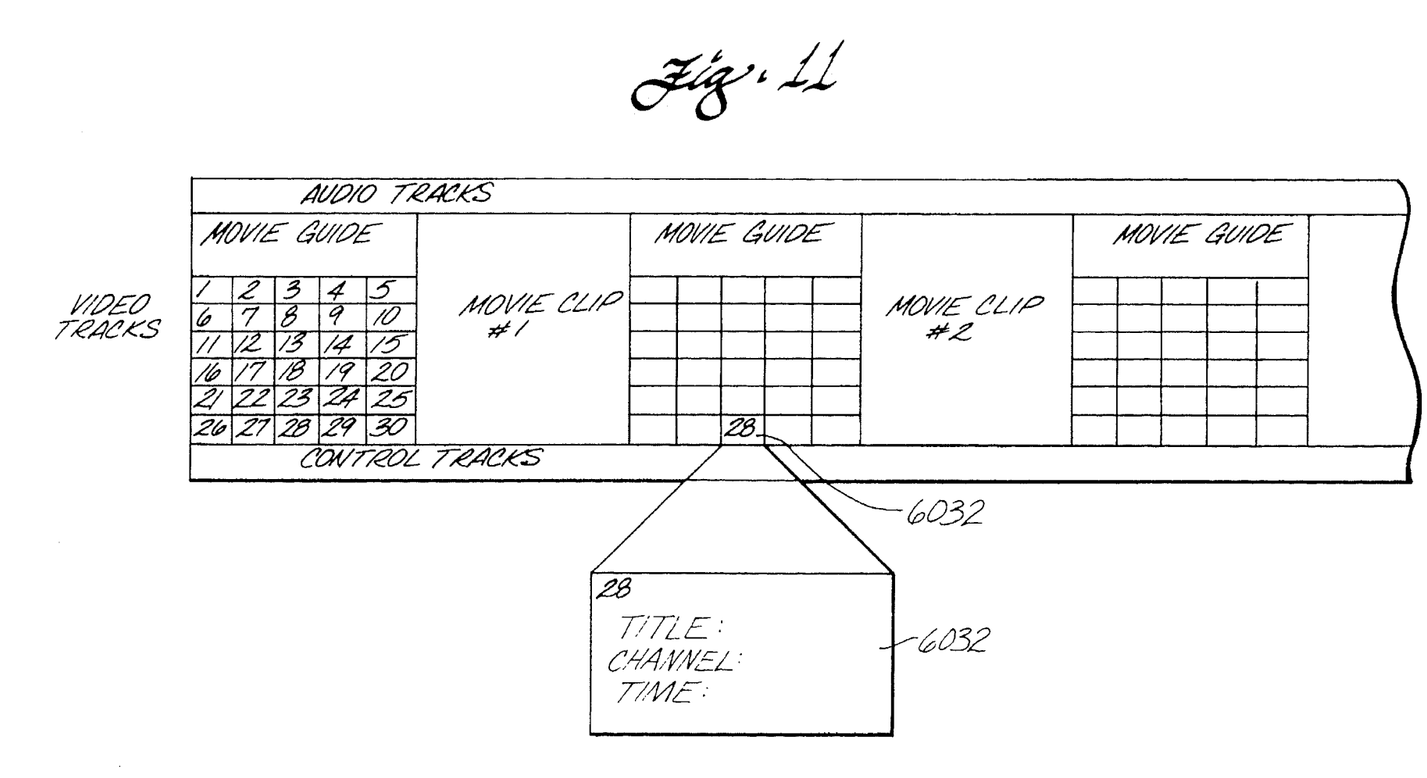
FIG. 11 is a schematic diagram of an alternative electronic program guide received and recorded on the VCR in accordance with the invention where selection is by number of the numbered cells.

Alternatively, each cell 6032 may be numbered, as shown in FIG. 11, and selected by the user following the steps of the flow chart depicted in FIG. 10.

Modifications may be made to the above described embodiment within the scope of this invention. It is intended in the claims to cover all modifications which come within the true spirit and scope of the invention.

What is claimed is:

1. A video tape recorder system for utilizing broadcast video signals representative of a first video program serving as a guide for subsequent video programs, and for also utilizing broadcast video signals representative of such subsequent video programs, and for utilizing broadcast auxiliary signals related to the first and subsequent video programs, said video tape recorder system comprising:

a receiver capable of receiving the broadcast video signals and the broadcast auxiliary signals;

recording circuitry coupled to said receiver for recording the broadcast video signals received by said receiver representative of the first program on a cassette tape in the form of at least one grid having a predetermined number of cells containing information representative of respective ones of said subsequent programs;

a decoder coupled to said receiver for decoding the auxiliary signals to produce information signals related to the first and subsequent programs; and a controller coupled to said decoder for receiving the information signals and for utilizing the information signals to select one or more of the subsequent programs for recording for future viewing.

2. The video tape recorder system defined in claim 1, wherein the information contained in each of said cells includes the channel and time of the corresponding one of said subsequent programs.

3. The video tape recorder system defined in claim 1, wherein said recording circuitry records the broadcast video signals representative of said first program in a series of such grids with each grid having a predetermined number of cells, and with each cell containing said information relating to a corresponding one of said subsequent programs.

4. The video tape recorder system defined in claim 1, wherein said broadcast video signals contain vertical blanking intervals (VBI), and in which said auxiliary signals are broadcast during said vertical blanking intervals.

5. The video tape recorder system defined in claim 4, wherein the information contained in each of said cells is received by said receiver as full frame video information contained in said broadcast video signals.

6. The video tape recorder system defined in claim 1, wherein said recording circuitry records the broadcast video signals representative of said first program in a series of such grids spaced from one another with each grid having a predetermined number of cells, and with each cell of each grid containing said information relative to a corresponding one of said subsequent programs, and in which video signals representative of film clips of corresponding ones of said subsequent programs are recorded between successive ones of said grids.

7. The video tape recorder system defined in claim 6, wherein said controller includes a manually operated keyboard for selecting respective ones of said cells under the control of the information signals from said decoder.

8. The video tape recorder system defined in claim 5, wherein said keyboard includes keys for selecting respective ones of said cells corresponding to corresponding ones of said subsequent programs.

9. The video tape recorder system defined in claim 8, wherein said keyboard includes a further key for selecting the film clips corresponding to the selected ones of said cells.

10. The video tape recorder system defined in claim 8, wherein said keyboard includes a further key for setting the video tape recorder system to record corresponding subsequent programs when received by said receiver.

11. The video tape recorder system defined in claim 10, wherein the video cassette recorder system setting occurs in response to a PLUSCODE™ number contained in said auxiliary signals received by said receiver.

12. A method for utilizing broadcast video signals representative of a first video program serving as a guide for subsequent programs and also for utilizing broadcast video signals representative of such subsequent video programs, and for utilizing broadcast auxiliary signals related to the first and subsequent video programs, and which includes the following steps:

receiving the broadcast video signals and auxiliary signals;

recording the received broadcast video signals representative of the first program on a cassette tape in at least one grid having a predetermined number of cells, with each cell containing information relative to a corresponding one of said subsequent programs;

decoding the received auxiliary signals to produce information signals related to the first and subsequent programs; and utilizing the information signals to select one or more of the subsequent programs for recording for future viewing.

13. The method defined in claim 12 wherein the broadcast video signals representative of the first program are recorded in a series of spaced grids with each grid having a predetermined number of cells, and with each cell containing said information relative to a corresponding one of said subsequent programs.

14. The method defined in claim 13 further including the step of recording video signals representative of a film clip of a corresponding one of said programs between successive ones of said grids.

15. The method defined in claim 13 further including the step of manually setting the VCR to record selected ones of the subsequent programs received by the receiver.

16. The method defined in claim 13 further including the step of manually selecting respective ones of said cells corresponding to corresponding ones of said subsequent programs for selecting the film clips corresponding to the selected ones of said cells.

17. The method defined in claim 12, wherein each cell is numbered and the step of utilizing the grid of cells and the information signals to select one or more of the subsequent programs for recording for future viewing includes the step of entering the number of the selected cell.

18. A video tape recorder system for utilizing broadcast video signals representative of a first video program serving as a guide for subsequent video programs, and for also utilizing broadcast video signals representative of such subsequent video programs, and for utilizing broadcast auxiliary signals related to the first and subsequent video programs, said video tape recorder system comprising:

a receiver capable of receiving the broadcast video signals and the broadcast auxiliary signals;

recording circuitry coupled to said receiver for recording the broadcast video signals received by said receiver representative of the first program on a cassette tape in the form of at least one grid having a predetermined number of cells, each cell having a unique number and each cell containing information representative of respective ones of said subsequent programs;

a decoder coupled to said receiver for decoding the auxiliary signals to produce information signals related to the first and subsequent programs;

a display for displaying the grid of cells; and means for entering the number of a displayed cell for selecting the cell in order to record the corresponding subsequent program for future viewing.

19. The video tape recorder system of claim 18 wherein the means for entering the number of a displayed cell for selecting the cell in order to record the corresponding subsequent program for future viewing comprises a remote controller.

20. The video tape recorder system of claim 19, wherein said recording circuitry records the broadcast video signals representative of said first program in a series of such grids spaced from one another with each grid having a predetermined number of cells, and with each cell of each grid containing said information relative to a corresponding one of said subsequent programs, and in which video signals representative of film clips of corresponding ones of said subsequent programs are recorded between successive ones of said grids.

21. The video tape recorder system of claim 20 further comprising means for entering the number of a displayed cell for selecting the cell in order to play a recorded film clip corresponding to the selected cell.

22. A method for utilizing broadcast video signals representative of a first video program serving as a guide for subsequent programs and also for utilizing broadcast video signals representative of such subsequent video programs, and for utilizing broadcast auxiliary signals related to the first and subsequent video programs, and which includes the following steps:

receiving the broadcast video signals and auxiliary signals;

recording the received broadcast video signals representative of the first program on a cassette tape in at least one grid having a predetermined number of cells, each cell containing a unique number and containing information relative to a corresponding one of said subsequent programs;

decoding the received auxiliary signals to produce information signals related to the first and subsequent programs;

displaying the grid; and utilizing the displayed grid of cells and the information signals to select one or more of the subsequent programs for recording for future viewing.

23. The method of claim 22 wherein the step of utilizing the displayed grid of cells and the information signals to select one or more of the subsequent programs for recording for future viewing comprises the step of entering the number of a displayed cell for selecting the cell in order to record the corresponding subsequent program for future viewing.

24. The method of claim 23 wherein the step of entering the number of a displayed cell for selecting the cell in order to record the corresponding subsequent program for future viewing comprises the step of entering the number on a remote controller.

25. The method defined in claim 22 wherein the broadcast video signals representative of the first program are recorded in a series of spaced grids with each grid having a predetermined number of cells, each cell containing a unique number and containing said information relative to a corresponding one of said subsequent programs; and the step of recording further includes the step of recording video signals representative of a film clip of a corresponding one of said programs between successive ones of said grids.

26. The method of claim 25 further comprising the step of entering the number of a displayed cell for selecting the cell in order to play a recorded film clip corresponding to the selected cell.

27. The method of claim 26 wherein the step of entering the number of a displayed cell for selecting the cell in order to play a recorded film clip corresponding to the selected cell comprises the step of entering the number on a remote controller.

* * * * *